US012729705B2

(12) United States Patent
Chen

(10) Patent No.: US 12,729,705 B2
(45) Date of Patent: Sep. 8, 2026

(54) QUICK RELEASE FASTENING DEVICE AND ASSEMBLY OF QUICK RELEASE FASTENING DEVICE AND OUTER TUBE

(71) Applicant: Yi-Fan Chen, Taichung City (TW)

(72) Inventor: Yi-Fan Chen, Taichung City (TW)

( * ) Notice: Subject to any disclaimer, the term of this patent is extended or adjusted under 35 U.S.C. 154(b) by 237 days.

(21) Appl. No.: 18/587,349

(22) Filed: Feb. 26, 2024

(65) Prior Publication Data

US 2025/0243888 A1 Jul. 31, 2025

(30) Foreign Application Priority Data

Jan. 25, 2024 (TW) ................................ 113200923

(51) Int. Cl.

| | |
|---|---|
| ***F16B 7/18*** | (2006.01) |
| ***F16B 2/18*** | (2006.01) |
| ***F16B 7/04*** | (2006.01) |
| ***F16F 1/12*** | (2006.01) |

(52) U.S. Cl.

CPC .............. *F16B 7/182* (2013.01); *F16B 2/185* (2013.01); *F16B 7/0406* (2013.01); *F16F 1/121* (2013.01); *Y10S 403/04* (2013.01); *Y10T 403/595* (2015.01)

(58) Field of Classification Search

CPC . B60G 11/16; F16B 2/18; F16B 2/185; F16B 7/0406; F16B 7/1418; F16B 7/1454; F16B 7/182; F16F 1/121; F16F 9/56; Y10S 403/04; Y10T 403/5746; Y10T 403/595

USPC ................................ 403/307, 322.4, DIG. 4

See application file for complete search history.

(56) References Cited

U.S. PATENT DOCUMENTS

| | | | | |
|---|---|---|---|---|
| 4,185,936 | A * | 1/1980 | Takahashi | F16B 7/1454 403/104 |
| 5,591,109 | A * | 1/1997 | Strnad | A63B 21/0728 24/524 |
| 6,827,184 | B1 * | 12/2004 | Lin | F16F 1/121 267/221 |
| 7,641,600 | B2 * | 1/2010 | Bingham, Jr. | F16B 7/1454 482/57 |
| 9,140,325 | B2 * | 9/2015 | Cox | F16F 1/121 |
| 9,651,073 | B2 * | 5/2017 | Bukovitz | F16B 7/1454 |
| 9,744,826 | B2 * | 8/2017 | Cox | F16F 1/121 |
| 12,151,526 | B2 * | 11/2024 | Becker | F16F 1/121 |
| 2005/0105963 | A1 * | 5/2005 | Maniezzo | F16B 2/185 403/289 |

(Continued)

FOREIGN PATENT DOCUMENTS

| | | |
|---|---|---|
| TW | M511441 U | 11/2015 |

*Primary Examiner* — Josh Skroupa

(74) *Attorney, Agent, or Firm* — MUNCY, GEISSLER, OLDS & LOWE, P.C.

(57) ABSTRACT

A quick release fastening device includes a threaded ring and at least one fastening unit. The threaded ring includes a ring-shaped main body including an outer surface, an inner threaded surface defining a threaded hole, at least one groove located on the outer surface, and at least one radial through hole located in the groove and communicating with the threaded hole. The fastening unit includes a stuffing block disposed in the radial through hole, movable along the radial direction of the threaded hole and including a threaded surface facing toward the threaded hole, and a quick release handle pivotably connected with the threaded ring and located in the groove for pushing the stuffing block toward the threaded hole when being pivoted from a release position to a tightly press position.

17 Claims, 11 Drawing Sheets

(56) References Cited

U.S. PATENT DOCUMENTS

| | | | | |
|---|---|---|---|---|
| 2006/0127167 | A1* | 6/2006 | Hsieh | F16B 2/185 403/109.5 |
| 2006/0279948 | A1* | 12/2006 | Tsai | F16B 7/1454 362/413 |
| 2025/0091402 | A1* | 3/2025 | Chen | B60G 17/021 |
| 2025/0367996 | A1* | 12/2025 | Chen | F16F 1/121 |

* cited by examiner

QUICK RELEASE FASTENING DEVICE AND ASSEMBLY OF QUICK RELEASE FASTENING DEVICE AND OUTER TUBE

BACKGROUND OF THE INVENTION

1. Field of the Invention

The present invention relates generally to fastening devices for being fastened to a threaded rod and more particularly, to a quick release fastening device, and an assembly of a quick release fastening device and an outer tube.

2. Description of the Related Art

The current car modification market is quite mature. Adjusting the spring preload of the shock absorber to adjust the cushioning effect of the car body, and adjusting the length of the shock absorber to adjust the height of the car body are quite important needs for consumers. These adjustments enable the driver to enjoy stability and comfort, or achieve the effect of reducing the wind resistance of the car body or improving appearance.

Referring to Taiwan Patent No. M511441, the conventional shock absorber of the vehicle suspension system primarily includes a threaded rod, a positionally limiting seat disposed at an end of the threaded rod, an outer tube screwed onto another end of the threaded rod, a spring sleeved onto the threaded rod, and a spring holder, a positioning ring and a push stopping ring, which are screwed onto the threaded rod. The positionally limiting seat is adapted to be connected to the vehicle chassis. The outer tube is adapted to be connected to a wheel axle. Two ends of the spring are abutted against the positionally limiting seat and the spring holder respectively. The conventional manner of adjusting the length of the shock absorber is rotating the outer tube to change the position thereof relative to the threaded rod. After the adjustment, the positioning ring is rotated to be tightly abutted against the outer tube to fasten the outer tube. The conventional manner of adjusting the spring preload is rotating the spring holder to change the position thereof relative to the threaded rod. After the adjustment, the push stopping ring is rotated to be tightly abutted against the spring holder to fasten the spring holder.

However, the above-described adjustment of the length of the shock absorber or the spring preload needs the use of a special wrench. Taking the adjustment of the spring preload as an example, the aforementioned wrench should be used to rotate the push stopping ring to relieve the spring holder of being fastened by the push stopping ring, and then the same wrench is used to rotate the spring holder to displace the spring holder along the threaded rod, so as to adjust the spring preload. When the required preload is achieved, the same wrench is used to rotate the push stopping ring to tightly press it on the spring holder, so as to fasten the spring holder again.

The above-described fastening manner requires the use of the special wrench, causing inconvenience to the user. Besides, the structure is complex, and the fastening effect is not good enough, so improvement is needed.

SUMMARY OF THE INVENTION

The present invention has been accomplished in view of the above-noted circumstances. It is an objective of the present invention to provide a quick release fastening device, which has simple structure and can be used without a special tool, convenient in usage and great in fastening effect.

To attain the above objective, the present invention provides a quick release fastening device which includes a threaded ring, and at least one fastening unit. The threaded ring includes a ring-shaped main body. The ring-shaped main body includes an outer surface, an inner threaded surface, a threaded hole defined by the inner threaded surface, at least one groove located on the outer surface, and at least one radial through hole located in the groove. The radial through hole communicates with the threaded hole. The fastening unit includes a stuffing block and a quick release handle. The stuffing block includes a threaded surface. The stuffing block is disposed in the radial through hole in a way that the stuffing block is movable along the radial direction of the threaded hole. The threaded surface of the stuffing block faces toward the threaded hole. The quick release handle is pivotably connected with the threaded ring in a way that the quick release handle is pivotable between a tightly press position and a release position and located in the groove. When being pivoted from the release position to the tightly press position, the quick release handle pushes the stuffing block toward the threaded hole.

As a result, the threaded ring of the quick release fastening device of the present invention is adapted to be screwed onto a threaded rod. When the user pivots the quick release handle to the release position, the user can easily rotate the entire quick release fastening device relative to the threaded rod to adjust the position thereof on the threaded rod. When the quick release fastening device is adjusted to the required position, as long as the quick release handle is pivoted to the tightly press position, the quick release handle will push the stuffing block toward the threaded rod to make the threaded surface of the stuffing block engaged with the outer threads of the threaded rod firmly, and meanwhile the quick release fastening device is fastened on the threaded rod firmly. The above-described operating process requires no use of a special tool, quite convenient in usage. Besides, the above-described quick release fastening device has simple structure, and can have not only the screwing connection with the threaded rod, but also the further engagement by the stuffing block, thereby great in fastening effect.

Further speaking, the quick release fastening device of the present invention may, but unlimited to, be applied to a shock absorber for fastening a lower end of a spring of the shock absorber, or fastening an outer tube of the shock absorber. When the user wants to adjust the length of the shock absorber or the spring preload, the user can only use the hand thereof to pivot the quick release handle to the release position, and then the user can rotate the quick release fastening device to adjust the position of the lower end of the spring so as to adjust the spring preload, or adjust the position of the outer tube to adjust the length of the shock absorber so as to adjust the height of the car body. After the adjustment, the user can only use the hand thereof to pivot the quick release handle back to the tightly press position to fasten the lower end of the spring or the outer tube again. The above-described adjusting process is fast and reliable, requires no use of an additional tool, and is great in fastening effect.

In the application for fastening the lower end of the spring of the shock absorber, the threaded ring may further include a flange protruding from an upper surface of the ring-shaped main body, and the inner threaded surface of the threaded ring may further extend to the flange. As a result, the upper surface of the ring-shaped main body is adapted to be abutted against the lower end of the spring, and the flange is embedded into the spring, such that the spring is prevented from moving radially, which can lower the abnormal noise produced by the shock absorber in operation.

In the application for fastening the outer tube of the shock absorber, the threaded ring may further include a plurality of hook portions extending from a lower surface of the ring-shaped main body for being hooked on the outer tube to make the quick release fastening device and the outer tube firmly combined with each other and movable relative to the threaded rod together.

The present invention further provides an assembly of the above-described quick release fastening device whose threaded ring includes the hook portions, and an outer tube. The outer tube includes a top surface, an opening located on the top surface, an outer surface, and a plurality of protrusions located on the outer surface and surrounding the opening. Every two adjacent protrusions are formed with a recessed portion therebetween. The lower surface of the ring-shaped main body of the threaded ring of the quick release fastening device is abutted on the top surface of the outer tube. The quick release fastening device is rotatable relative to the outer tube to a first angular position and a second angular position. When the quick release fastening device is located at the first angular position, the hook portions of the threaded ring are hooked on the protrusions of the outer tube respectively. When the quick release fastening device is located at the second angular position, the hook portions of the threaded ring are located in the recessed portions of the outer tube respectively, and the quick release fastening device and the outer tube are separatable from each other.

As a result, the user can firstly locate the quick release fastening device at the second angular position for initial connection with the outer tube to make the hook portions of the threaded ring located in the recessed portions of the outer tube respectively and the lower surface of the threaded ring abutted on the top surface of the outer tube, and then rotate the quick release fastening device to the first angular position to make the hook portions of the threaded ring hooked on the protrusions of the outer tube respectively. In this way, the quick release fastening device and the outer tube are firmly combined with each other, and the quick release fastening device and the outer tube are movable relative to the threaded rod together.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
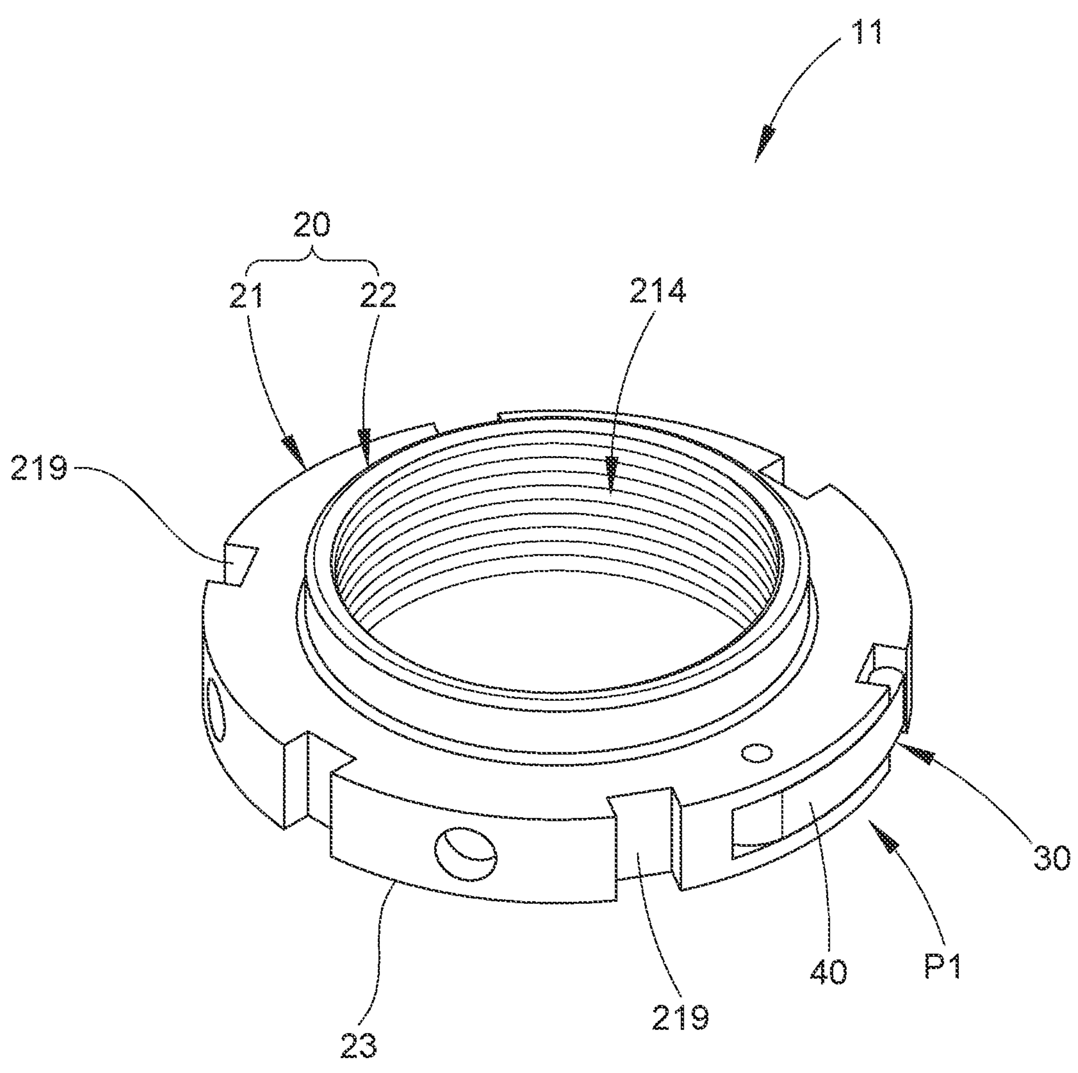
FIG. 1 is an assembled perspective view of a quick release fastening device according to a first preferred embodiment of the present invention.

First of all, it is to be mentioned that same or similar reference numerals used in the following embodiments and the appendix drawings designate same or similar elements or the structural features thereof throughout the specification for the purpose of concise illustration of the present invention. It should be noticed that for the convenience of illustration, the components and the structure shown in the figures are not drawn according to the real scale and amount, and the features mentioned in each embodiment can be applied in the other embodiments if the application is possible in practice.

Figure 2:
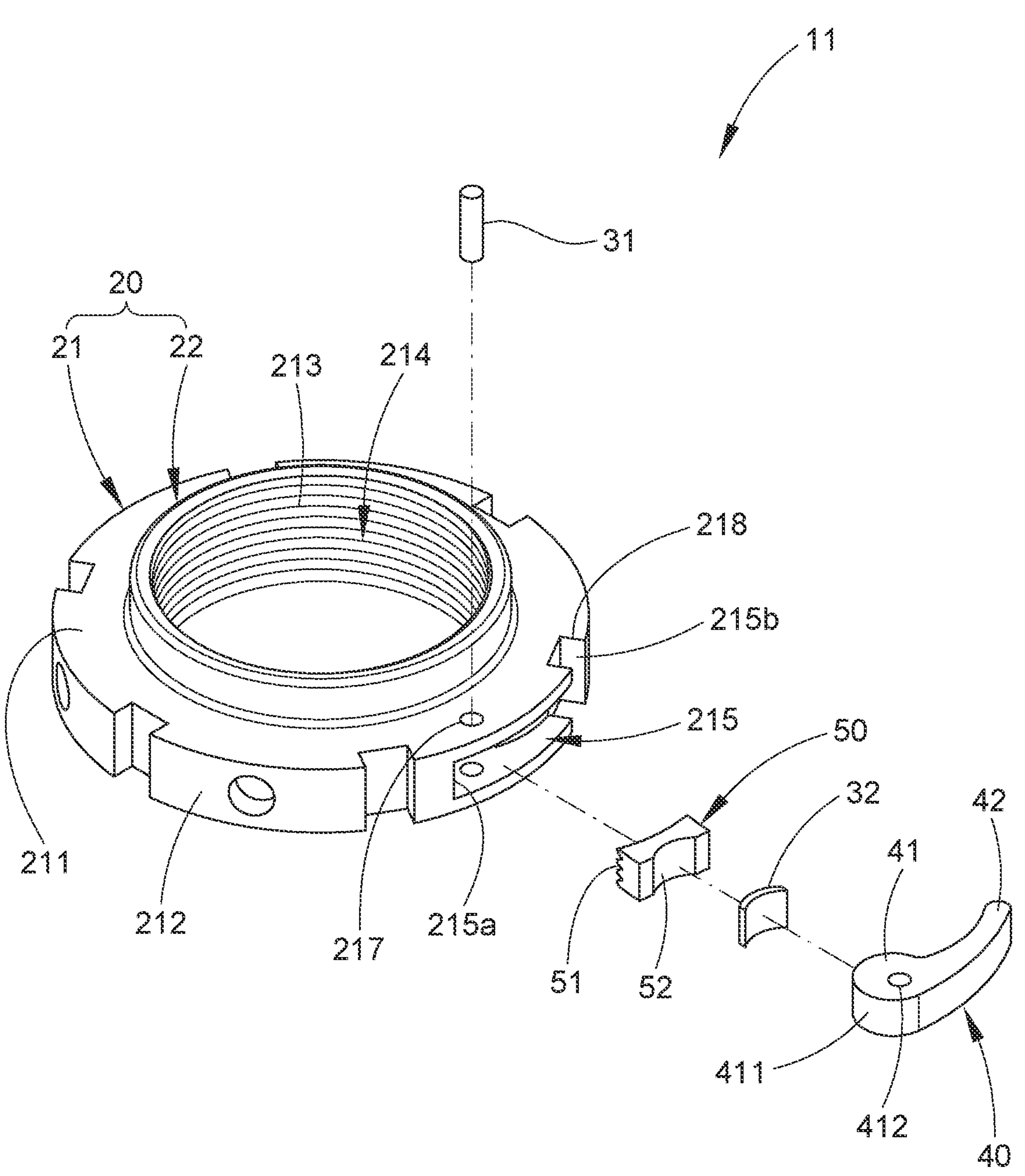
FIG. 2 is an exploded perspective view of the quick release fastening device.

Referring to FIG. 1 and FIG. 2, a quick release fastening device 11 according to a first preferred embodiment of the present invention includes a threaded ring 20, and a fastening unit 30.

Figure 3:
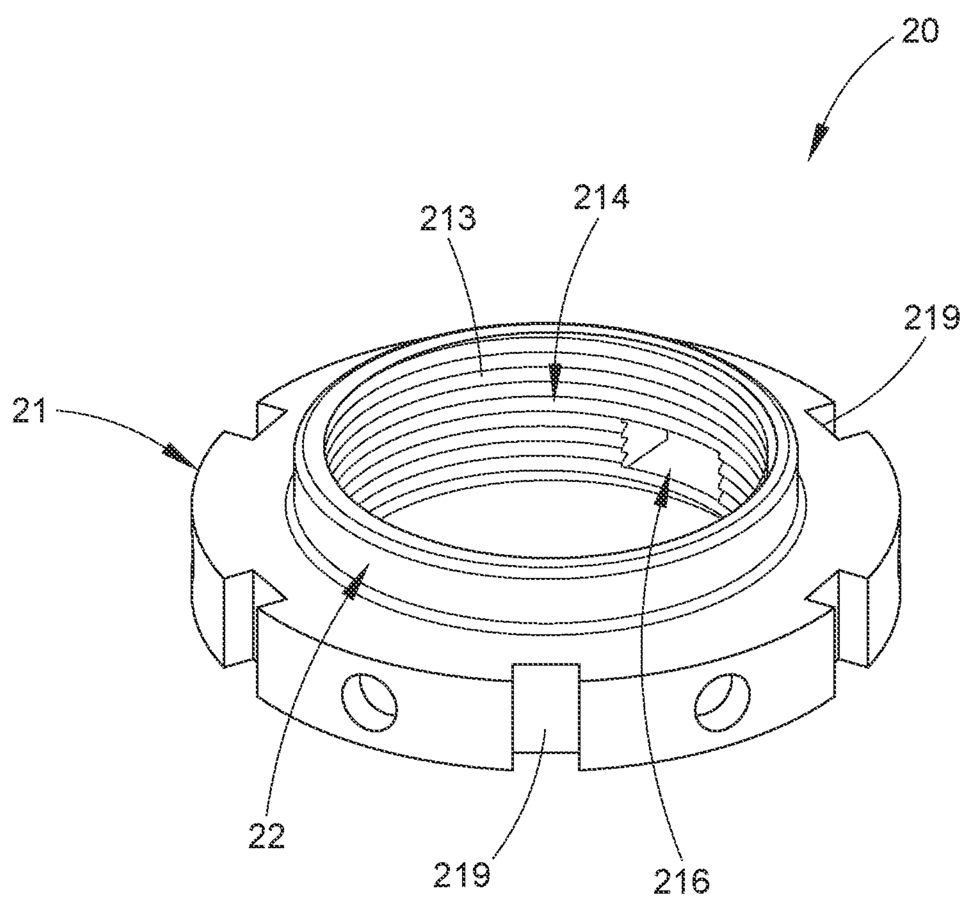
FIG. 3 is a perspective view of a threaded ring of the quick release fastening device.
Figure 5:
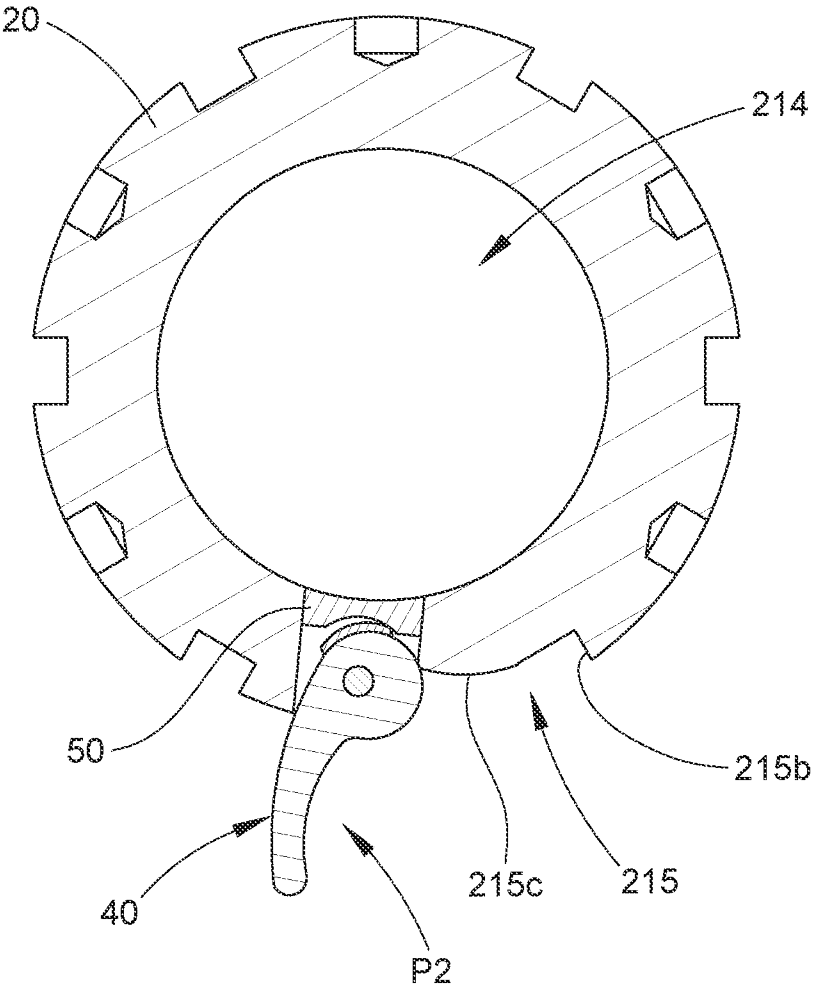
FIG. 5 is similar to FIG. 4, but showing that the quick release handle is located at a release position.
Figure 6:
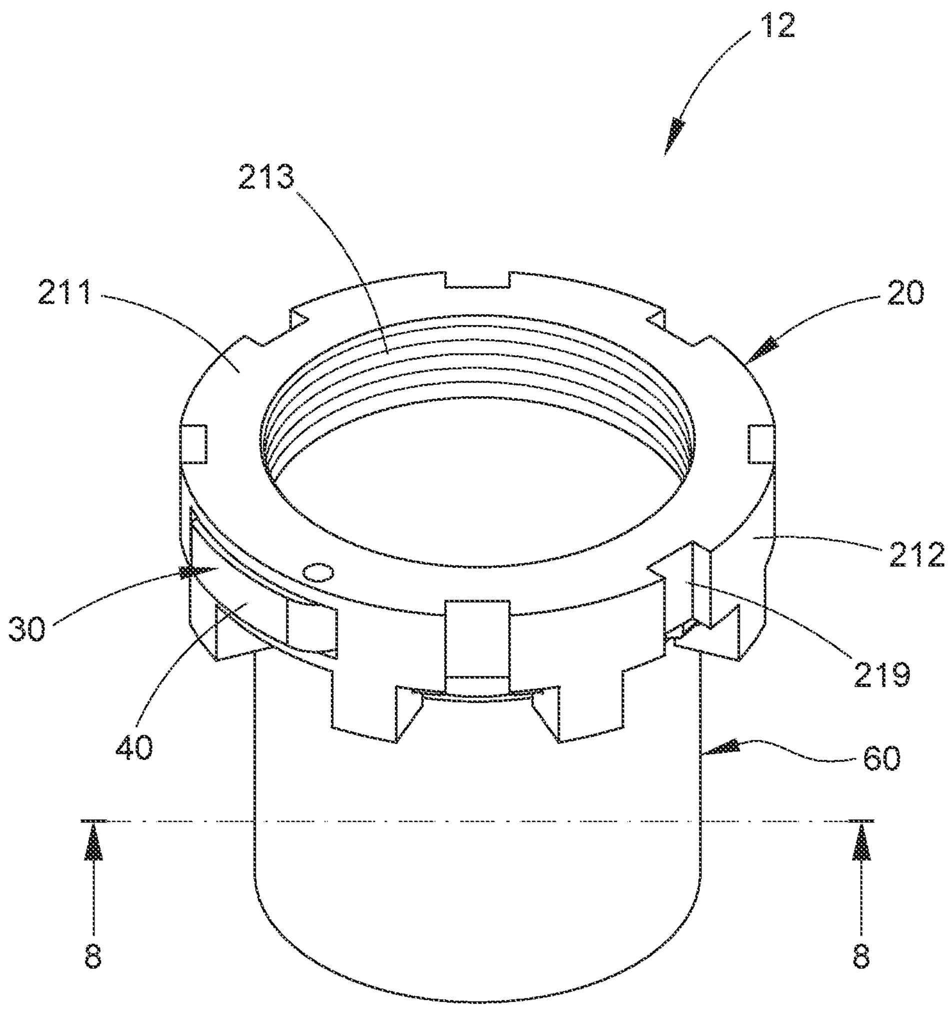
FIG. 6 is an assembled perspective view of a quick release fastening device and an outer tube according to a second preferred embodiment of the present invention.
Figure 7:
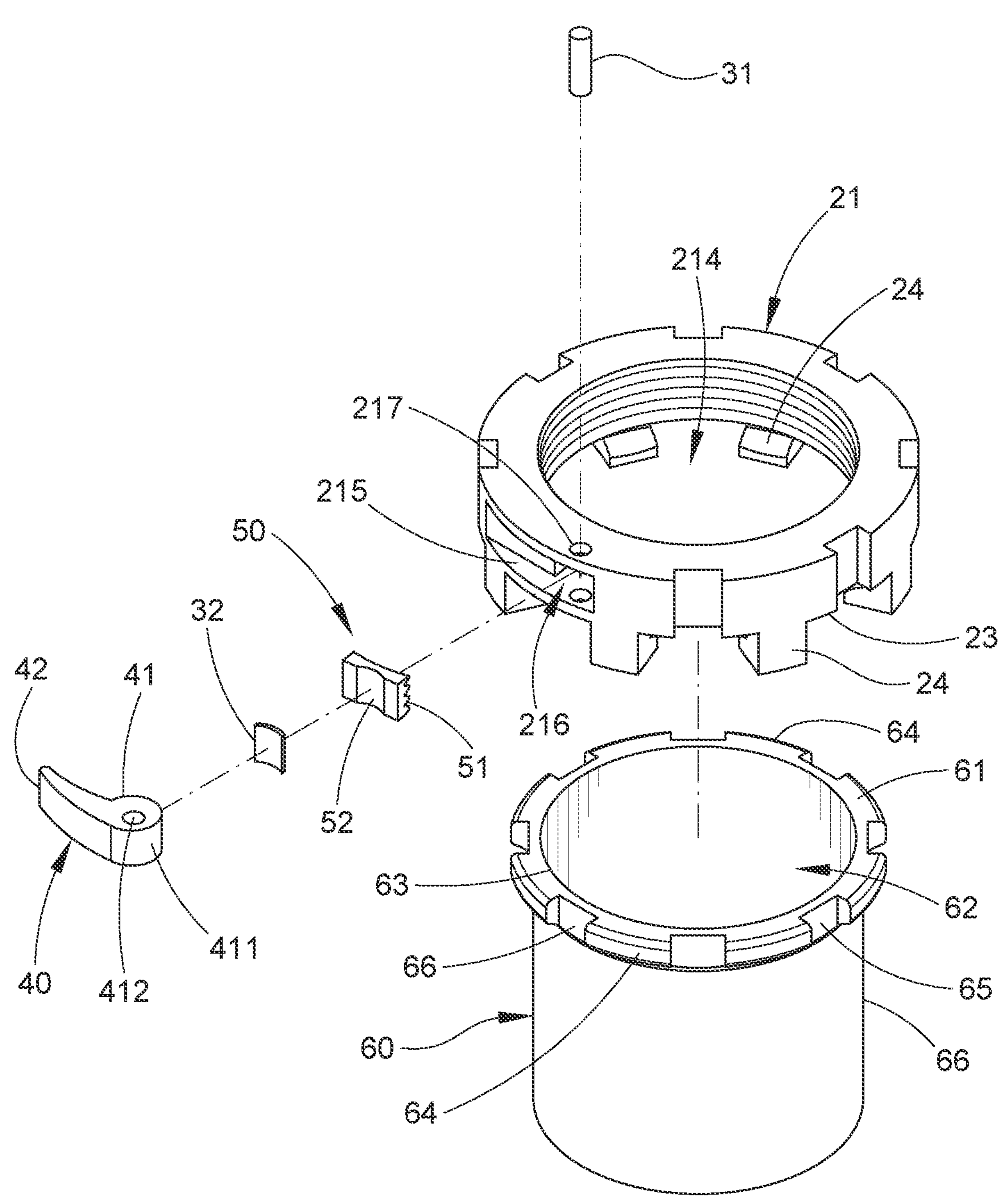
FIG. 7 is an exploded perspective view of the quick release fastening device and the outer tube.

In this embodiment, the threaded ring 20 includes a ring-shaped main body 21, which is shaped as a closed ring, and a flange 22 protruding from an upper surface 211 of the ring-shaped main body 21. However, the threaded ring 20 in the present invention may include only the ring-shaped main body 21, but no such flange 22. The ring-shaped main body 21 includes an outer surface 212, an inner threaded surface 213, a threaded hole 214 defined by the inner threaded surface 213, a groove 215 located on the outer surface 212, and a radial through hole 216 (as shown in FIG. 3) located in the groove 215. Because the threaded ring 20 in this embodiment includes the flange 22, the inner threaded surface 213 further extends to the flange 22, thereby forming the relatively longer threaded hole 214. As shown in FIG. 2, the groove 215 has a first side **215*a* and a second side 215*b* opposite to each other. The radial through hole 216 extends from the part of an inner surface 215*c* (as shown in FIG. 5) of the groove 215 adjacent to the first side 215*a* toward the center of the threaded hole 214, which means extending along the radial direction of the threaded hole 214, and penetrates through the inner threaded surface 213. Therefore, the radial through hole 216 communicates with the threaded hole 214. Besides, the ring-shaped main body 21 further includes a pivot hole 217 passing through the groove 215 and located adjacent to the first side 215*a* thereof, an accommodating recess 218 located on the second side 215*b* of the groove 215, and five recesses 219 (unlimited in amount) provided on the outer surface 212**.

Figure 4:
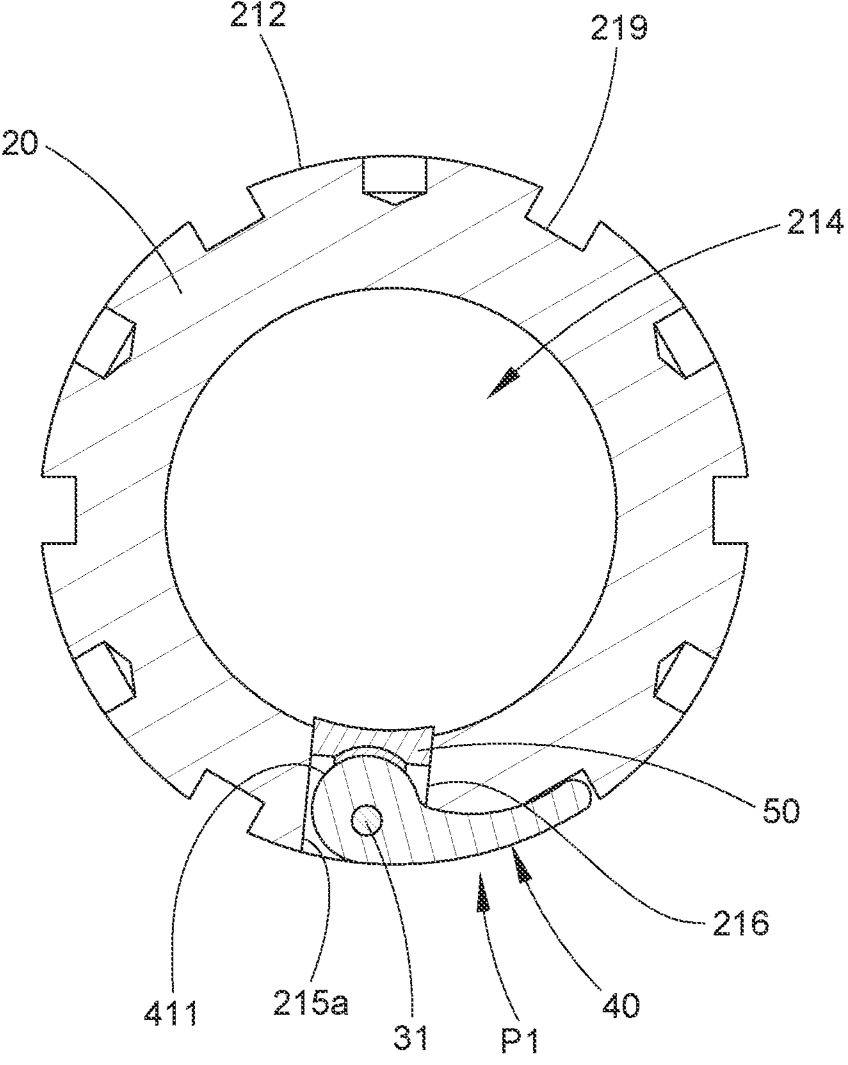
FIG. 4 is a sectional view of the quick release fastening device, showing that a quick release handle thereof is located at a tightly press position.

As shown in FIG. 2, the fastening unit 30 includes a pivot 31, an arc washer 32, a quick release handle 40, and a stuffing block 50. The quick release handle 40 is pivotably connected with the threaded ring 20, located in the groove 215, and pivotable between a tightly press position P1 as shown in FIG. 1 and FIG. 4 and a release position P2 as shown in FIG. 5. Specifically speaking, the quick release handle 40 includes a pushing end portion 41 and a hold end portion 42. The pushing end portion 41 includes an arc surface 411, and an axial hole 412 deviated from the center of the circle corresponding to the arc surface 411. The pushing end portion 41 is disposed in the groove 215 in a way that the axial hole 412 is coaxial with the pivot hole 217. The pivot 31 is inserted through the pivot hole 217 and the axial hole 412 to make the quick release handle 40 and the threaded ring 20 pivotably connected with each other. The stuffing block 50 includes a threaded surface 51 and an arc surface 52, which face toward opposite directions. The stuffing block 50 is disposed in the radial through hole 216 and movable along the radial direction of the threaded hole 214. Therefore, the stuffing block 50 is located between the pushing end portion 41 of the quick release handle 40 and the threaded hole 214. The threaded surface 51 of the stuffing block 50 faces toward the threaded hole 214, and the arc surface 52 faces toward the arc surface 411 of the pushing end portion 41 if the quick release handle 40. The arc washer 32 is disposed between the arc surface 52 of the stuffing block 50 and the arc surface 411 of the quick release handle 40, but there may be no such arc washer 32.

In the usage condition, the threaded ring 20 is screwed onto a threaded rod (not shown) by the threaded hole 214. When the user pivots the quick release handle 40 to the release position P2 as shown in FIG. 5, the quick release handle 40 doesn't tightly push the stuffing block 50, so the stuffing block 50 doesn't protrude out of the inner threaded surface 213 of the threaded ring 20, and meanwhile the user can easily rotate the entire quick release fastening device 11 relative to the threaded rod to adjust the position of the quick release fastening device 11 on the threaded rod. When the quick release fastening device is adjusted to the required position, the user can pivot the quick release handle 40 to the tightly press position P1, as shown in FIG. 4. At this time, the hold end portion 42 of the quick release handle 40 is located in the accommodating recess 218, and the entire quick release handle 40 is completely located in the groove 215 and tightly abutted against the threaded ring 20. When the quick release handle 40 is pivoted from the release position P2 to the tightly press position P1, the pushing end portion 41 of the quick release handle 40 pushes the stuffing block 50 toward the threaded rod 214, which means the stuffing block 50 is further pushed toward the threaded rod, so that the threaded surface 51 of the stuffing block 50 is engaged with the outer threads of the threaded rod, and meanwhile the quick release fastening device 11 is fastened on the threaded rod firmly. The above-described operating process requires no use of a special tool, quite convenient in usage. Besides, the quick release fastening device of the present invention has simple structure, and can have not only the screwing connection with the threaded rod, but also the further engagement with the threaded rod resulted from the quick release handle 40 pushing the stuffing block 50, thereby great in fastening effect.

The quick release fastening device 11 in this embodiment is adapted for the spring preload adjustment of the shock absorber, which means the threaded ring 20 is screwed onto the threaded rod of the shock absorber, and the upper surface 211 of the ring-shaped main body 21 is abutted against the lower end of the spring of the shock absorber. When the user wants to adjust the spring preload, the user can only use the hand thereof to pivot the quick release handle 40 to the release position P2, and then the user can rotate the quick release fastening device 11 to adjust the position of the lower end of the spring so as to adjust the spring preload. After the adjustment, the user can only use the hand thereof to pivot the quick release handle 40 back to the tightly press position P1 to fasten the lower end of the spring again. The above-described adjusting process is fast and reliable, requires no use of an additional tool, and is great in fastening effect. The user can further engage a specific wrench tool (not shown) with the recess 219 of the threaded ring 20 and rotate the threaded ring 20 by the tool, so as to rotate the threaded ring 20 even tighter or fine tune the positions thereof. Besides, the flange 22 of the threaded ring 20 in this embodiment can be embedded into the spring to prevent the spring from moving radially, so as to lower the abnormal noise produced by the shock absorber in operation.

The quick release fastening device of the present invention is also adapted for fastening the outer tube of the shock absorber and adjusting the position of the outer tube on the threaded rod so as to adjust the height of the car. Therefore, a second preferred embodiment of the present invention provides an assembly of a quick release fastening device 12 and an outer tube 60, as shown in FIG. 6 to FIG. 9.

The quick release fastening device 12 in this embodiment is similar to the quick release fastening device 11 in the first preferred embodiment. However, the threaded ring 20 in this embodiment has no such flange 22, but includes a plurality of hook portions 24 extending from a lower surface 23 of the ring-shaped main body 21. Other parts of the quick release fastening device 12 are the same with those of the first preferred embodiment, and can achieve the same effects, thereby not repeatedly described hereinafter.

The outer tube 60 is approximately shaped as a cylindrical tube, having a top surface 61, and an accommodating hole 62 extending downwardly from the top surface 61. The accommodating hole 62 has an opening 63 located on the top surface 61. The outer tube 60 is sleeved onto the lower end portion of the threaded rod in a way that the top surface 61 faces toward the quick release fastening device 12. Besides, the outer tube 60 further includes a plurality of protrusions 64 located adjacent to the top surface 61. The plurality of protrusions 64 are located on an outer surface 65 of the outer tube 60 and arranged with equal intervals to surround the opening 63. Every two adjacent protrusions 64 are formed with a recessed portion 66 therebetween.

Figure 8:
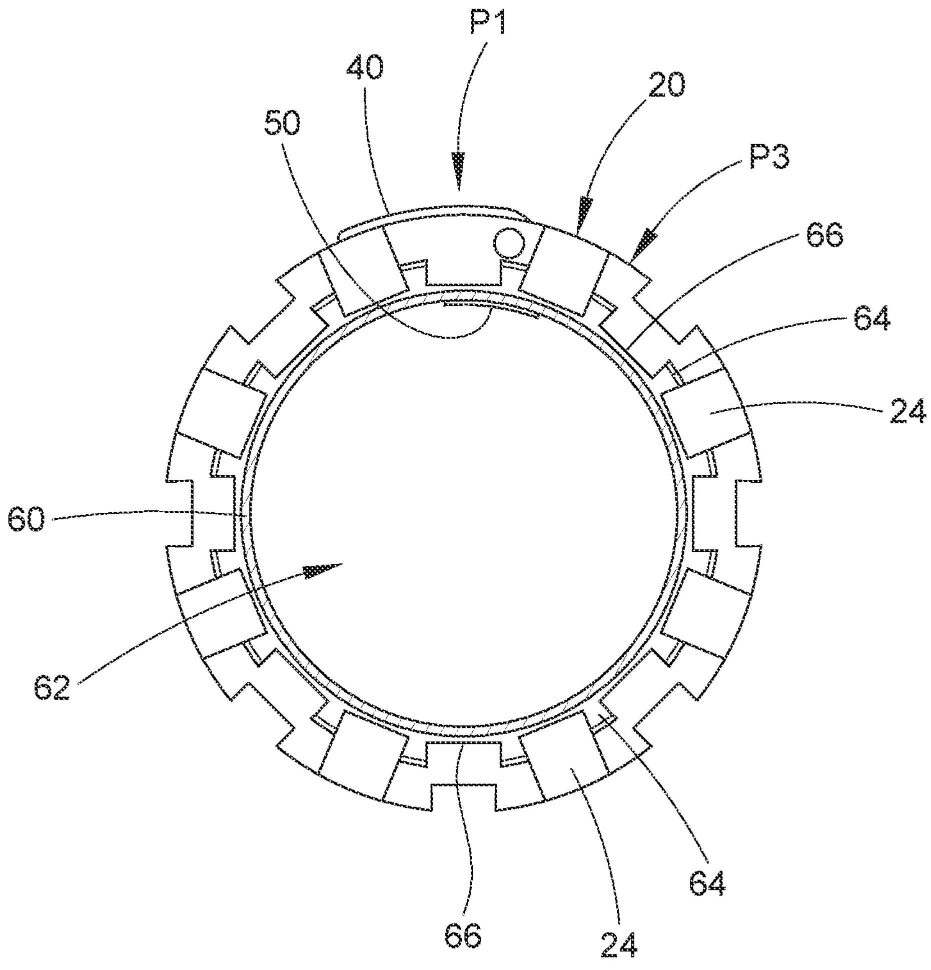
FIG. 8 is a sectional view taken along the line 8-8 in FIG. 6, showing that the quick release fastening device is located at a first angular position and a quick release handle thereof is located at a tightly press position.

In the usage condition, the lower surface 23 of the ring-shaped main body 21 of the threaded ring 20 is abutted on the top surface 61 of the outer tube 60, and the hook portions 24 are hooked on the protrusions 64 of the outer tube 60 respectively. At this time, the quick release fastening device 12 is located relative to the outer tube 60 at a first angular position P3 as shown in FIG. 8, and the threaded ring 20 and the outer tube 60 are combined with each other in the hooked manner. Besides, in the usage condition, the quick release handle 40 is located at the tightly press position P1, so the outer tube 60 is fastened to the threaded rod firmly by the quick release fastening device 12.

Figure 9:
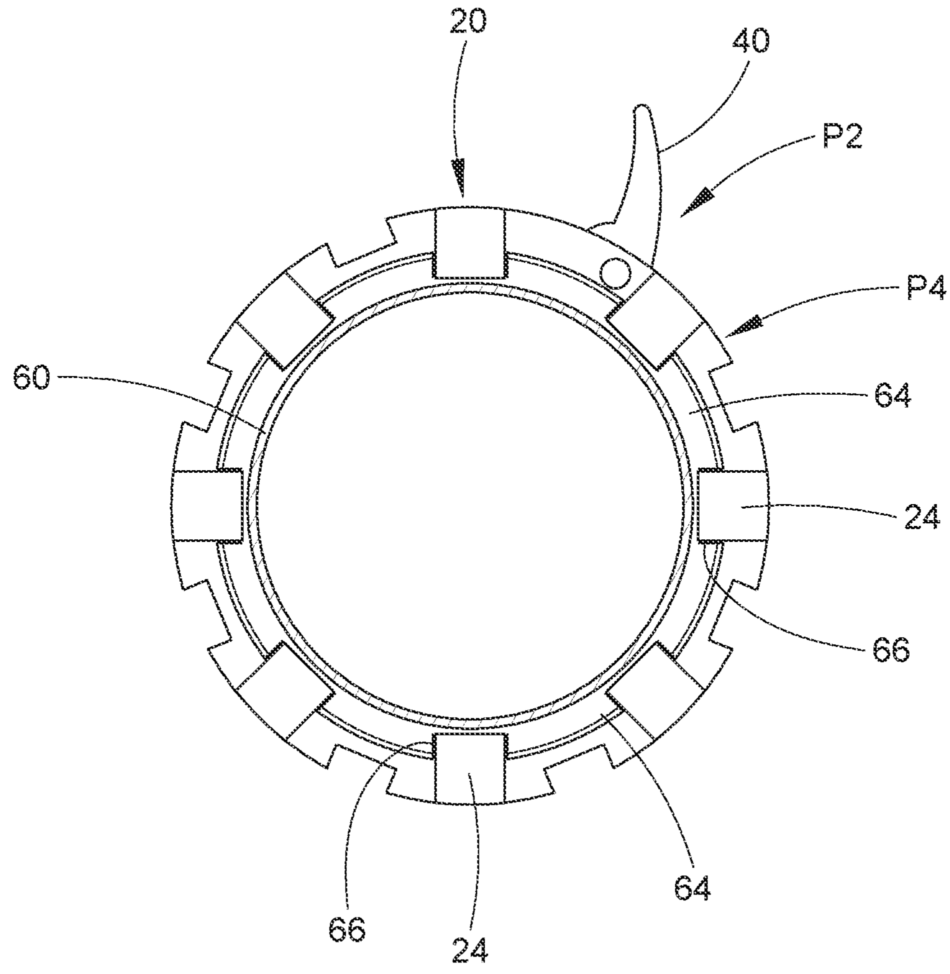
FIG. 9 is similar to FIG. 8, but showing that the quick release fastening device is located at a second angular position and the quick release handle is located at a release position.

As shown in FIG. 9, when the quick release handle 40 is located at the release position P2, the quick release fastening device 12 is rotatable relative to the outer tube 60 to a second angular position P4 to make the hook portions 24 located in the recessed portions 66 of the outer tube 60 respectively, and meanwhile the quick release fastening device 12 and the outer tube 60 are separatable from each other. It can be seen that the quick release fastening device 12 and the outer tube 60 are combined in a way that the quick release fastening device 12 is firstly located at the second angular position P4 to be initially abutted on the outer tube 60 so that the hook portions 24 are located in the recessed portions 66 of the outer tube 60 respectively and the lower surface 23 of the ring-shaped main body 21 is abutted on the top surface 61 of the outer tube 60, and then the quick release fastening device 12 is rotated to the first angular position P3 to make the hook portions 24 hooked on the protrusions 64 of the outer tube 60 respectively, such that the quick release fastening device 12 and the outer tube 60 are firmly combined with each other.

When the user wants to adjust the length of the shock absorber, the user can only use the hand thereof to pivot the quick release handle 40 to the release position P2, and then the user can rotate the threaded rod to make the quick release fastening device 12 and the outer tube 60 move along the threaded rod together, thereby adjusting the position of the outer tube 60 relative to threaded rod to adjust the length of the shock absorber, so as to adjust the height of the car body. After the adjustment, the user can only use the hand thereof to pivot the quick release handle 40 to the tightly press position P1 to fasten the quick release fastening device 12 and the outer tube 60 to the threaded rod firmly again. The above-described adjusting process requires no use of an additional tool, quite convenient, fast and reliable.

Figure 10:
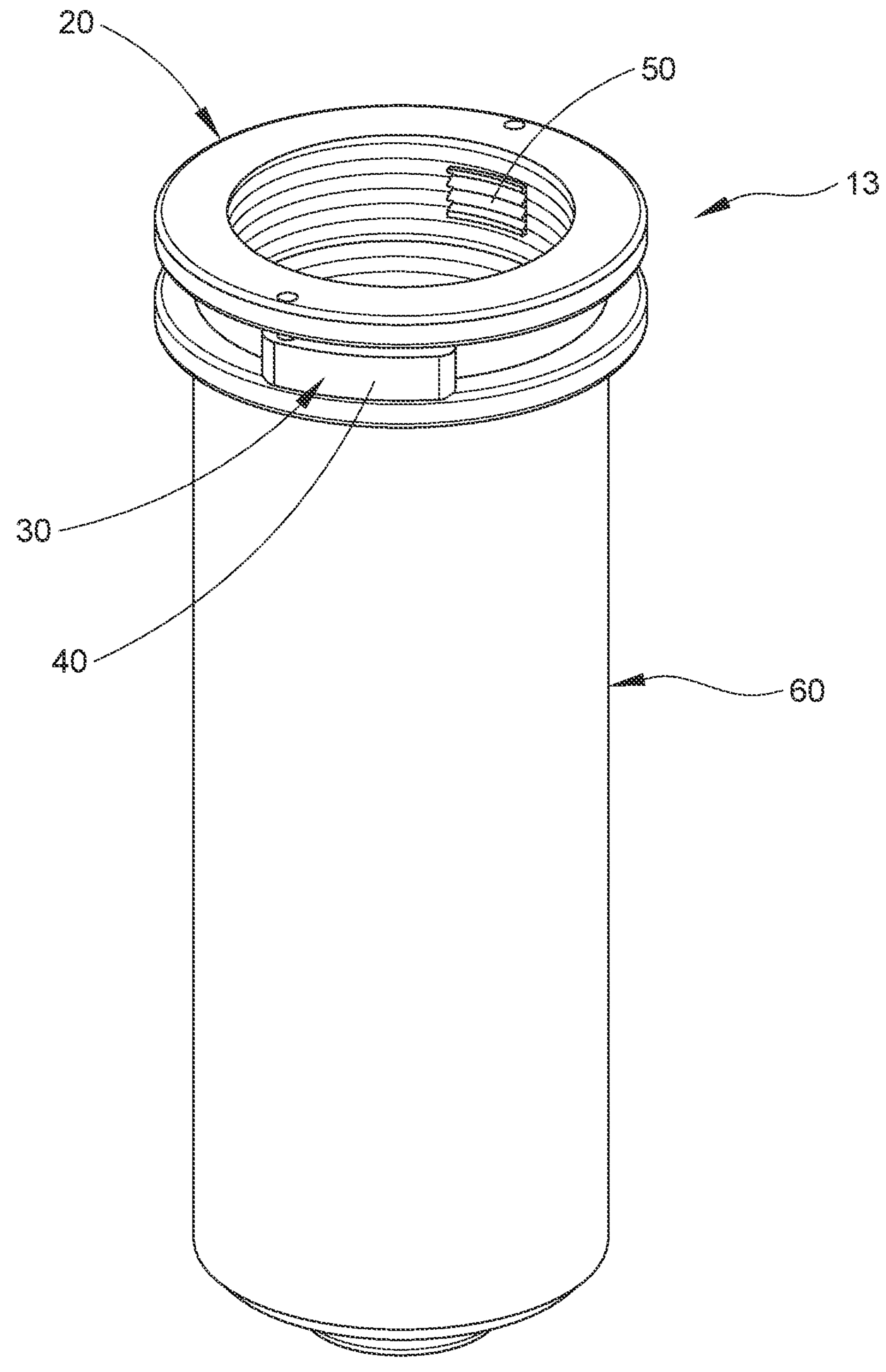
FIG. 10 and FIG. 11 are respectively an assembled perspective view and an exploded perspective view of a quick release fastening device and an outer tube according to a third preferred embodiment of the present invention.
Figure 11:
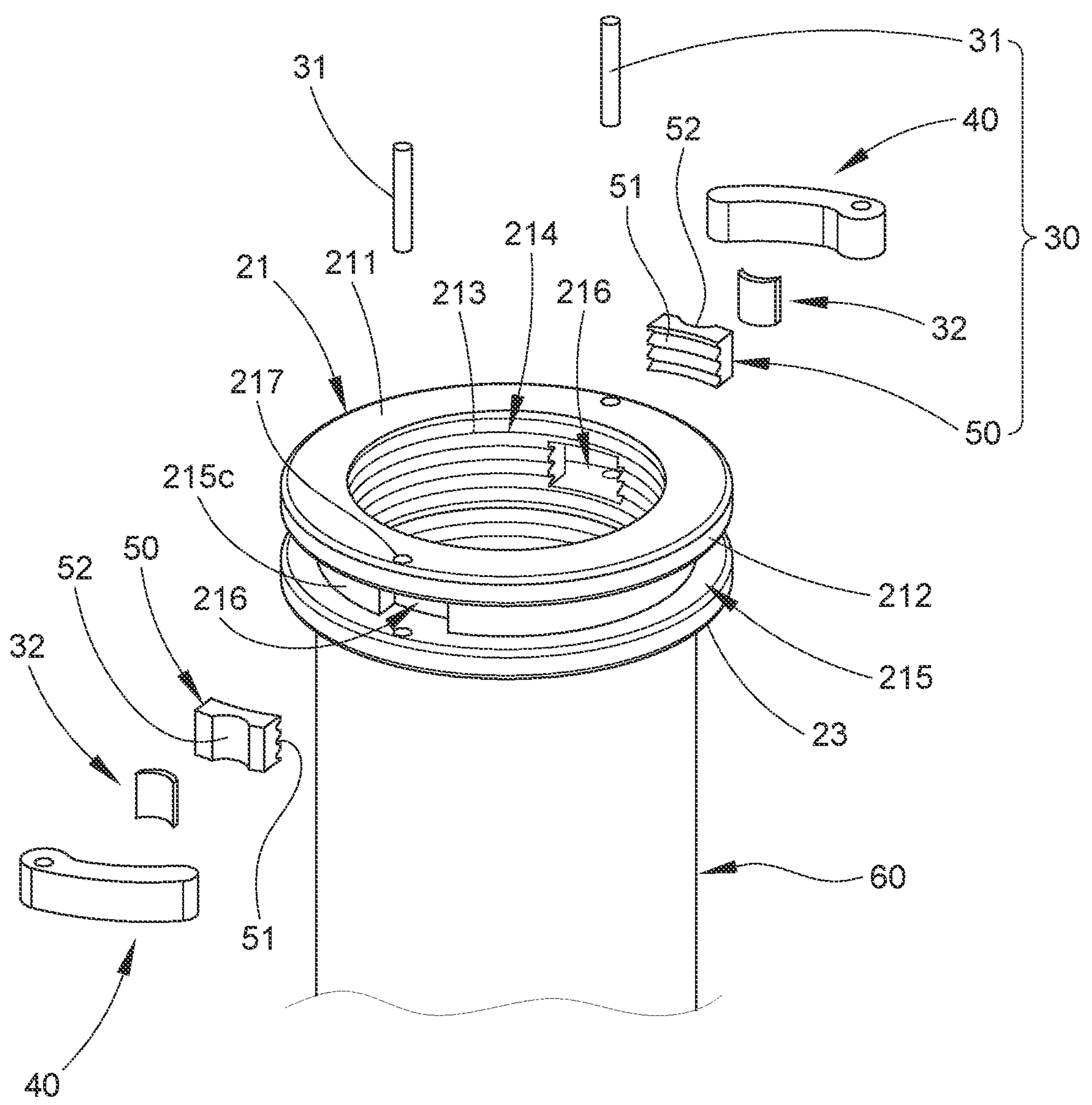

However, in the condition that the quick release fastening device of the present invention is used to fasten the outer tube of the shock absorber, the threaded ring 20 and the outer tube 60 are unlimited to have the above-described hooked structure with the hook portions 24 and the protrusions 64. For example, the assembly of a quick release fastening device 13 and an outer tube 60 according to a third preferred embodiment of the present invention as shown in FIG. 10 and FIG. 11 have no such hooked structure as described above, wherein the outer tube 60 has inner threads and thereby can be screwed onto the threaded rod, and then tightly abutting the quick release fastening device 13 against the outer tube 60 can also bring great fastening effect on the outer tube 60.

The quick release fastening device 13 in this embodiment is similar to the quick release fastening devices 11 and 12 in the first and second preferred embodiments. However, in this embodiment, the threaded ring 20 has no such flange 22 and hook portions 24, and the quick release fastening device 13 includes two fastening units 30. Specifically speaking, the groove 215 of the threaded ring 20 in this embodiment surrounds the outer surface 212 of the ring-shaped main body 21, and the groove 215 is provided therein with two radial through holes 216 located at opposite positions. The threaded ring 20 is also provided with two pivot holes 217 located correspondingly to the radial through holes 216 respectively. The stuffing blocks 50 of the fastening units 30 are disposed in the radial through holes 216 respectively, and the quick release handles 40 are pivotably connected with the threaded ring 20 by the pivots 31 inserted through the pivot holes 217 respectively. It is to be mentioned that the groove 215 is unlimited to be annular. For example, it may be modified into two such grooves 215 as illustrated in the first and second preferred embodiments for disposing the two fastening units 30 respectively.

As a result, the quick release fastening device 13 in this embodiment can bring the fastening effect similar to that of the quick release fastening devices 11 and 12 in the first and second preferred embodiments, which means using the quick release handle 40 to push the stuffing block 50 to be engaged with the threaded rod firmly. Furthermore, the quick release fastening device 13 in this embodiment uses two fastening units 30 for the engagement with the threaded rod at opposite positions, not only having even better fastening effect, but also applying relatively more balanced force to the threaded rod.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A quick release fastening device comprising:

a threaded ring comprising a ring-shaped main body, the ring-shaped main body comprising an outer surface, an inner threaded surface, a threaded hole defined by the inner threaded surface, at least one groove located on the outer surface, and at least one radial through hole located in the groove, the radial through hole communicating with the threaded hole; and at least one fastening unit comprising:

a stuffing block comprising a threaded surface, the stuffing block being disposed in the radial through hole in a way that the stuffing block is movable along a radial direction of the threaded hole, the threaded surface of the stuffing block facing toward the threaded hole; and a quick release handle pivotably connected with the threaded ring in a way that the quick release handle is pivotable between a press position and a release position and located in the groove, when being pivoted from the release position to the press position, the quick release handle pushing the stuffing block toward the threaded hole.

2. The quick release fastening device as claimed in claim 1, wherein the threaded ring further comprises a flange protruding from an upper surface of the ring-shaped main body; the inner threaded surface further extends to the flange.

3. The quick release fastening device as claimed in claim 1, wherein the threaded ring further comprises a plurality of hook portions extending from a lower surface of the ring-shaped main body.

4. An assembly comprising:

the quick release fastening device as claimed in claim 3; and an outer tube comprising a top surface, an opening located on the top surface, an outer surface, and a plurality of protrusions located on the outer surface and surrounding the opening, every two adjacent said protrusions being formed with a recessed portion therebetween;

wherein the lower surface of the ring-shaped main body of the threaded ring of the quick release fastening device is abutted on the top surface of the outer tube; the quick release fastening device is rotatable relative to the outer tube to a first angular position and a second angular position; when the quick release fastening device is located at the first angular position, the hook portions of the threaded ring are hooked on the protrusions of the outer tube respectively; when the quick release fastening device is located at the second angular position, the hook portions of the threaded ring are located in the recessed portions of the outer tube respectively, and the quick release fastening device and the outer tube are separatable from each other.

5. The assembly as claimed in claim 4, wherein the threaded ring comprises two said radial through holes located at opposite positions; the quick release fastening device comprises two said fastening units; the stuffing blocks of the two fastening units are disposed in the two radial through holes respectively.

6. The assembly as claimed in claim 4, wherein the ring-shaped main body of the threaded ring further comprises at least one recess provided on the outer surface for a user to engage a tool with the recess and rotate the threaded ring by the tool.

7. The assembly as claimed in claim 6, wherein the stuffing block comprises an arc surface; the arc surface faces toward the quick release handle.

8. The assembly as claimed in claim 7, wherein an arc washer is further disposed between the arc surface of the stuffing block and the quick release handle.

9. The assembly as claimed in claim 4, wherein the stuffing block comprises an arc surface; the arc surface faces toward the quick release handle.

10. The assembly as claimed in claim 9, wherein an arc washer is further disposed between the arc surface of the stuffing block and the quick release handle.

11. The quick release fastening device as claimed in claim 1, wherein the threaded ring comprises two said radial through holes located at opposite positions; the quick release fastening device comprises two said fastening units; the stuffing blocks of the two fastening units are disposed in the two radial through holes respectively.

12. The quick release fastening device as claimed in claim 11, wherein the ring-shaped main body of the threaded ring further comprises at least one recess provided on the outer surface for a user to engage a tool with the recess and rotate the threaded ring by the tool.

13. The quick release fastening device as claimed in claim 12, wherein the stuffing block comprises an arc surface; the arc surface faces toward the quick release handle.

14. The quick release fastening device as claimed in claim 13, wherein an arc washer is further disposed between the arc surface of the stuffing block and the quick release handle.

15. The quick release fastening device as claimed in claim 1, wherein the ring-shaped main body of the threaded ring further comprises at least one recess provided on the outer surface for a user to engage a tool with the recess and rotate the threaded ring by the tool.

16. The quick release fastening device as claimed in claim 1, wherein the stuffing block comprises an arc surface; the arc surface faces toward the quick release handle.

17. The quick release fastening device as claimed in claim 16, wherein an arc washer is further disposed between the arc surface of the stuffing block and the quick release handle.

* * * * *